United States Patent
Binek et al.

(10) Patent No.: US 11,745,416 B2
(45) Date of Patent: *Sep. 5, 2023

(54) ENHANCED RECOATER EDGES

(71) Applicant: Hamilton Sundstrand Corporation, Charlotte, NC (US)

(72) Inventors: Lawrence Binek, Glastonbury, CT (US); David W. Morganson, Marlborough, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,632

(22) Filed: Apr. 29, 2022

(65) Prior Publication Data

US 2022/0266510 A1  Aug. 25, 2022

Related U.S. Application Data

(63) Continuation of application No. 16/258,121, filed on Jan. 25, 2019, now Pat. No. 11,351,725.

(51) Int. Cl.
    *G05B 19/00* (2006.01)
    *B29C 64/153* (2017.01)
    (Continued)

(52) U.S. Cl.
    CPC ............ *B29C 64/153* (2017.08); *B22F 10/28* (2021.01); *B22F 12/67* (2021.01); *B33Y 40/00* (2014.12); *G05B 19/41805* (2013.01); *B23K 26/06* (2013.01); *B29C 64/20* (2017.08); *B29C 64/386* (2017.08); *B29K 2105/251* (2013.01);
    (Continued)

(58) Field of Classification Search
    CPC ..... B29C 64/141; B29C 64/153; B22F 10/20; B23K 26/06; G05B 2219/49
    See application file for complete search history.

(56) References Cited

U.S. PATENT DOCUMENTS 6,651,303 B1   11/2003  Toivanen et al.
2006/0219163 A1  10/2006  Merot et al.
(Continued)

FOREIGN PATENT DOCUMENTS

CN    105172145 A    12/2015
JP    H05318708 A    12/1993
(Continued)

OTHER PUBLICATIONS

Kawaguchi et al, DE 3328820, (translation), Sep. 12, 1991, 12 pgs <DE_3328820.pdf>.*

(Continued)

*Primary Examiner* — Tuan A Vu
(74) *Attorney, Agent, or Firm* — Locke Lord LLP; Scott D. Wofsy; Joshua L. Jones

(57) ABSTRACT

An additive manufacturing device includes a build platform. A recoater is operatively connected to the build platform to move relative to the build platform to coat unfused powder onto a build on the build platform. The recoater includes a recoater mount defining a length-wise receptacle therein, and a recoater blade seated in the receptacle. A blade reel system is operatively connected to the recoater to replace the recoater blade in the receptacle during a build on the build platform.

3 Claims, 2 Drawing Sheets

(51) Int. Cl.
- *B33Y 40/00* (2020.01)
- *B22F 10/28* (2021.01)
- *B22F 12/67* (2021.01)
- *G05B 19/418* (2006.01)
- *B33Y 10/00* (2015.01)
- *B33Y 30/00* (2015.01)
- *B33Y 50/02* (2015.01)
- *B29C 64/386* (2017.01)
- *B29C 64/20* (2017.01)
- *B23K 26/06* (2014.01)
- *B29K 105/00* (2006.01)

(52) U.S. Cl.
CPC .............. *B33Y 10/00* (2014.12); *B33Y 30/00* (2014.12); *B33Y 50/02* (2014.12); *G05B 2219/49* (2013.01)

(56) References Cited

U.S. PATENT DOCUMENTS

| | | |
|---|---|---|
| 2007/0075461 A1 | 4/2007 | Hunter et al. |
| 2010/0038268 A1 | 2/2010 | Reynolds et al. |
| 2018/0133796 A1* | 5/2018 | Kawada ................ B22F 10/20 |
| 2018/0200964 A1* | 7/2018 | Rockstroh ............ B29C 64/141 |
| 2018/0236549 A1 | 8/2018 | Spears et al. |
| 2020/0101665 A1 | 4/2020 | Beets et al. |

FOREIGN PATENT DOCUMENTS

| | | |
|---|---|---|
| KR | 10-2015-0133328 A | 11/2015 |
| KR | 2015/0133328 A | 11/2015 |
| WO | 2018/043869 | 3/2018 |

OTHER PUBLICATIONS

Extended European Search Report dated Feb. 28, 2020, issuedduring the prosecution of European Patent Application No. EP 19210022.0.

EP Communication Pursuant to Article 94(3) EPC dated Jul. 29, 2021, issued during the prosecution of European Patent Application No. EP 19210022.0, 5 pages.

Communication pursuant to Art 94(3) EPC dated Jan. 11, 2023, issued during the prosecution of European Patent Application No. 19210022.0.

* cited by examiner

ENHANCED RECOATER EDGES

CROSS-REFERENCE TO RELATED APPLICATIONS

This is a continuation of U.S. patent application Ser. No. 16/258,121 filed Jan. 25, 2019 the content of which is incorporated by reference herein in its entirety.

BACKGROUND

1. Technological Field

The present disclosure relates to additive manufacturing, and more particularly to controlling geometries in additive manufacturing techniques such as laser powder bed fusion, and the like.

2. Description of Related Art

Laser powder bed fusion additive manufacturing and electron beam additive manufacturing use directed energy in conjunction with powder feedstock to form a sintered structure. The energy source, e.g., the laser beam or electron beam, excites the target material to the point of phase-change. This melt-pool process, coupled with an active toolpath effectively welds a single layer of powder feedstock into a solid state. Once one layer has been formed, a recoater pushes a thin layer of powder feedstock across the build surface and the process repeats.

Build quality is often dependent on the state of the recoater blade, which is a wear part that has to be replaced relatively often. Some powder metals are more abrasive than others. As a recoater blade degrades due to friction, the recoating quality may begin to fail. This may be exhibited by clumps of material being dropped by the recoater back onto the build surface. These issues can cause build failures.

The conventional techniques have been considered satisfactory for their intended purpose. However, there is an ever present need for improved additive manufacturing systems and methods. This disclosure provides a solution for this need.

SUMMARY OF THE INVENTION

An additive manufacturing device includes a build platform. A recoater is operatively connected to the build platform to move relative to the build platform to coat unfused powder onto a build on the build platform. The recoater includes a recoater mount defining a length-wise receptacle therein, and a recoater blade seated in the receptacle. A blade reel system is operatively connected to the recoater to replace the recoater blade in the receptacle during a build on the build platform.

The blade reel system can be mounted stationary relative to the build platform outside of a build area. The blade reel system can include a reel configured to feed fresh recoater blade material into the receptacle, replacing used recoater blade material. The blade reel system can include a cutter operatively connected to cut fresh blade material to free the recoater from the blade reel system to recoat the build area using the fresh blade material.

The blade reel system can be mounted to the recoater for movement together with the recoater relative to the build platform. The blade reel system can include a supply reel and a take up reel on opposite ends of the recoater mount. The supply reel and take up reel can be configured to reel blade material through the receptacle as the recoater passes over the build area. The supply reel and the take up reel can be configured to reel the blade material back and forth as the recoater passes over the build area.

The blade reel system can include a magazine with adequate capacity to hold a reel of recoater blade material sufficient to completely replace the recoater blade material with each pass of the recoater over the build area during a build.

A method of additive manufacturing includes recoating powder over a build area using a recoater and selectively fusing a portion of the powder to a build in the build area. The method includes replacing a recoater blade in the recoater with the build in progress, and repeating recoating, selectively fusing, and replacing the recoater blade until the build is complete.

Replacing a recoater blade can include moving the recoater beyond the build area to a blade reel system. Replacing the recoater blade can include reeling fresh recoater blade material into a receptacle of the recoater. The method can include cutting the fresh blade material to free the recoater to recoat the build area using the fresh blade material.

Replacing a recoater blade in the recoater can include moving a blade reel system together with the recoater and reeling blade material through the receptacle as the recoater passes over the build area. Reeling blade material through the receptacle as the recoater passes over the build area can include reeling the blade material back and forth in the recoater receptacle as the recoater passes over the build area.

Replacing the recoater blade can include completely replacing the recoater blade for each recoating pass of the recoater over the build area.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
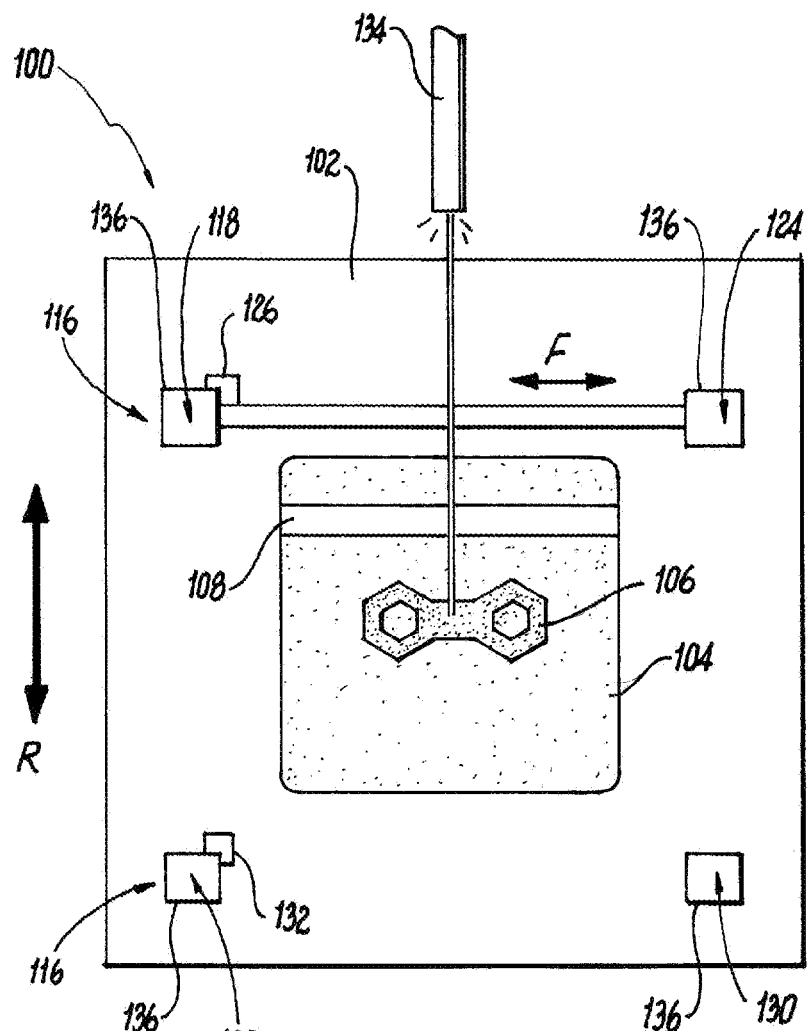
FIG. 1 is a schematic plan view of an exemplary embodiment of an additive manufacturing device constructed in accordance with the present disclosure, showing a blade reel system that is stationary relative to the build platform.

Reference will now be made to the drawings wherein like reference numerals identify similar structural features or aspects of the subject disclosure. For purposes of explanation and illustration, and not limitation, a partial view of an exemplary embodiment of an additive manufacturing device in accordance with the disclosure is shown in FIG. 1 and is designated generally by reference character 100. Other embodiments of additive manufacturing devices in accordance with the disclosure, or aspects thereof, are provided in FIGS. 2-3, as will be described. The systems and methods described herein can be used to improve build quality in additive manufacturing processes such as laser powder bed fusion (LPBF).

The additive manufacturing device 100 includes a build platform 102 a portion of which is a build area 104 for additively manufacturing a part 106. A recoater 108 is operatively connected to the build platform 102 to move relative to the build platform 102 to coat unfused powder onto a build, e.g., the part 106 in progress, on the build platform 102.

Figure 2:
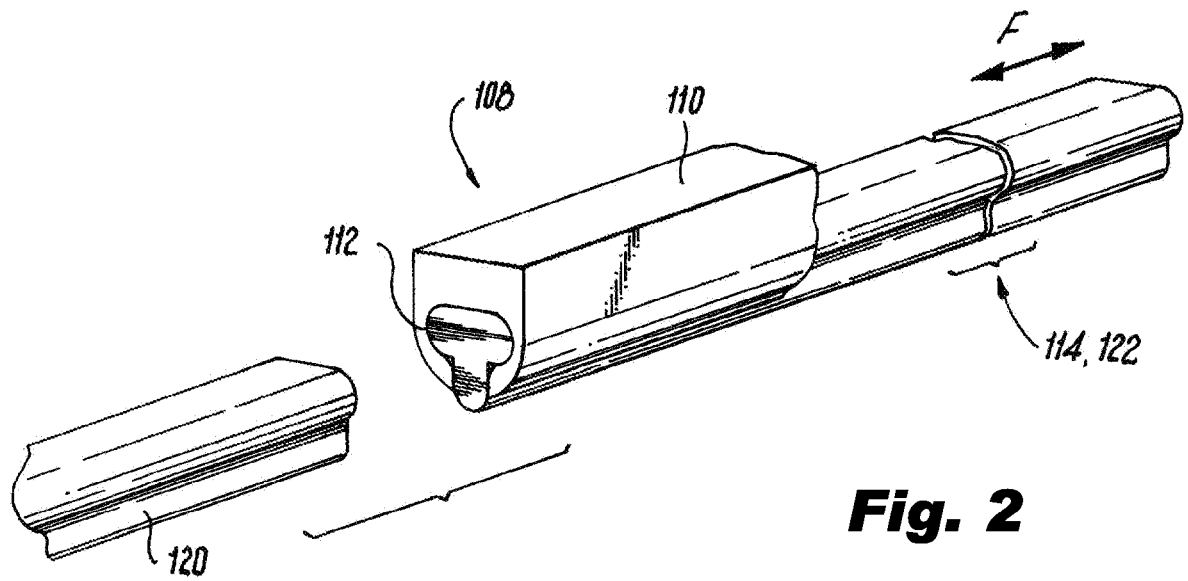
FIG. 2 is a schematic perspective view of a portion the device of FIG. 1, showing the recoater blade material seated in the receptacle of the recoater mount.

With reference now to FIG. 2, the recoater 108 includes a recoater mount 110 defining a length-wise receptacle 112 therein. A recoater blade 114 is seated in the receptacle 112. The recoater blade 114 is of a relatively soft material for soft-recoater additive manufacturing. For example, polymeric 0.25 inch (6.35 mm) O-ring stock material, or any other suitable material can be used. The recoater mount 110 is of a relatively hard material, such as stainless steel, tungsten carbide, nylon 12, or the like.

Referring again to FIGS. 1 and 2 a blade reel system 116 is operatively connected to the recoater 108 to replace the recoater blade 114 (shown in FIG. 2) in the receptacle 112 during a build on the build platform 102. The blade reel system 116 is mounted stationary relative to the build platform 102 outside of the build area 104. The blade reel system 116 includes a first feed reel 118 configured to feed fresh recoater blade material 120 (shown in FIG. 2) into the receptacle 112, replacing used recoater blade material 122 as the fresh recoater blade material 120 is reeled in the direction F into the receptacle 112. A first up take reel 124 is included opposite the first feed reel 118 for taking up the used recoater blade material 122. The blade reel system 116 includes a cutter and loader 126 operatively connected to remove used recoater blade material 122 (shown in FIG. 2), load the fresh blade material 120 in place, and cut it after it is loaded into the receptacle 112 to free the recoater 108 from the blade reel system 116 so the recoater 108 can recoat the build area 104 using the fresh blade material 120.

As shown in FIG. 1, the recoater 108 is shown recoating the build area 104 while approaching the first feed reel 118 and up take reel 124. The blade reel system 116 optionally includes a second feed reel 128 and a second up take reel 130 at an opposite end of the build area 104 from the first feed reel 118 and first up take reel 124. After the first feed reel and uptake reel 118, 124 replace the recoater blade 114, the recoater 108 can approach the second feed and up take reels 128, 130, which similarly replace the recoater blade 114 and cut the recoater 108 loose with a cutter 132. In this manner, the recoater 108 can recoat the build area 104 with each pass in ether recoat direction R, as indicated with the large double arrow in FIG. 1. Each pass can use a fresh recoater blade 114. As the recoater 108 is reloading at the blade real system 116 at either end of the build area, the laser 134 can selectively fuse part of the last layer of powder from recoating to the part 106.

Figure 3:
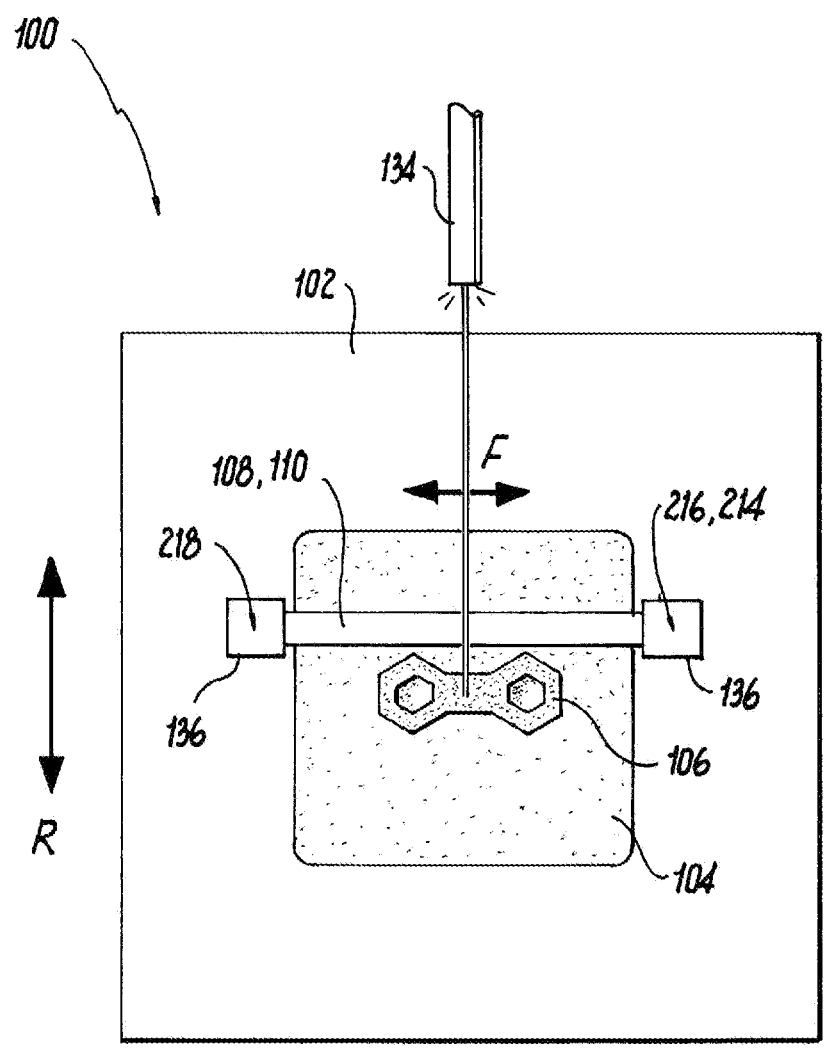
FIG. 3 is a schematic plan view of another exemplary embodiment of an additive manufacturing device constructed in accordance with the present disclosure, showing a blade reel system that is mounted for movement together with the recoater relative to the build platform.

With reference now to FIG. 3, another exemplary embodiment of a blade reel system 216 is shown. The blade reel system 216 is mounted to the recoater 108 for movement together with the recoater 108 relative to the build platform 102. The blade reel system 216 includes a supply reel 218 and a take up reel 214 on opposite ends of the recoater mount 110. The supply reel 218 and take up reel 214 are configured to reel blade material 120 through the receptacle 112 (as shown in FIG. 2) as the recoater 108 passes over the build area 104. This movement can be intermittent or continuous as needed to maintain a fresh recoater blade 114. It is also contemplated that the supply reel 218 and the take up reel 214 can reel the blade material 120 back and forth in the direction F as the recoater 108 passes over and recoats the build area 104.

Each of the reels 118, 124, 128, 130, 218, 214 of FIGS. 1 and 2 can include a spool magazine 136 with adequate capacity to hold a reel of recoater blade material 120 sufficient to completely replace the recoater blade material 120 with each pass of the recoater 108 over the build area 104 during a build. Some applications may not need complete replacement of the recoater blade material 120 with each pass, in which case less frequent replacement can be used. This system allows for replacement of the blade material 120 during a build each time it the recoater blade 114 becomes degraded to a point where further use would risk a build failure.

A method of additive manufacturing includes recoating powder over a build area (e.g. build area 104) using a recoater (e.g. recoater 108) and selectively fusing a portion of the powder to a build in the build area as indicated schematically in FIGS. 1 and 3 with the laser 134. The method includes replacing a recoater blade (e.g. recoater blade 114) in the recoater with the build in progress, and repeating recoating, selectively fusing, and replacing the recoater blade until the build is complete (e.g., until part 106 is finished).

The methods and systems of the present disclosure, as described above and shown in the drawings, provide for additive manufacturing with superior properties including reduced build failures and more consistent build properties and quality throughout a build due to a fresh recoater blade replenished on the fly during builds. While the apparatus and methods of the subject disclosure have been shown and described with reference to the exemplified embodiments, those skilled in the art will readily appreciate that changes and/or modifications may be made thereto without departing from the scope of the subject disclosure.

What is claimed is:
1. An additive manufacturing device comprising:
a build platform;
a recoater operatively connected to the build platform to move relative to the build platform to coat unfused powder onto a build on the build platform, wherein the recoater includes a recoater mount defining a length-wise receptacle therein, and a recoater blade seated in the receptacle; and
a blade reel system operatively connected to the recoater to replace the recoater blade in the receptacle during a build on the build platform, wherein the blade reel system includes a first supply reel and a first take up reel, and a second supply reel and a second take up reel on an opposite end of the build area from the first feed reel and the first take up reel, wherein the blade reel system is mounted stationary relative to the build platform outside of a build area, wherein each of the first supply reel and the second supply reel are configured to feed fresh recoater blade material into the receptacle, replacing used recoater blade material, wherein the blade reel system includes a cutter operatively connected to cut fresh blade material to free the recoater from the blade reel system to recoat the build area using the fresh blade material.

2. The device as recited in claim 1, wherein the respective first and second feed reels are on opposite ends of the recoater mount from the respective first and second take up reels.

3. The device as recited in claim 1, wherein the blade reel system includes a magazine with adequate capacity to hold a reel of recoater blade material sufficient to completely replace the recoater blade material with each pass of the recoater over the build area during a build.

* * * * *